US008565616B2

(12) United States Patent
Tanaka et al.

(10) Patent No.: US 8,565,616 B2
(45) Date of Patent: Oct. 22, 2013

(54) POLARIZED-WAVE-MULTIPLEXING OPTICAL TRANSMITTER AND CONTROL METHOD OF POLARIZED-WAVE-MULTIPLEXED OPTICAL SIGNAL

(75) Inventors: Toshiki Tanaka, Kawasaki (JP); Yuichi Akiyama, Kawasaki (JP); Masato Nishihara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 317 days.

(21) Appl. No.: 13/028,677

(22) Filed: Feb. 16, 2011

(65) Prior Publication Data

US 2011/0222853 A1      Sep. 15, 2011

(30) Foreign Application Priority Data

Mar. 10, 2010   (JP) .................................. 2010-052583

(51) Int. Cl.
*H04B 10/04*            (2011.01)
(52) U.S. Cl.
USPC ............. 398/184; 398/183; 398/152; 398/65; 398/201; 398/198; 398/196; 398/197; 398/33; 398/38; 398/32
(58) Field of Classification Search
USPC ......... 398/184, 183, 192, 193, 194, 195, 196, 398/197, 198, 65, 152, 79, 158, 159, 147, 398/81, 33, 38, 200, 201, 188, 186, 25, 26, 398/27, 30, 31, 32, 34
See application file for complete search history.

(56) References Cited

U.S. PATENT DOCUMENTS

| 6,714,742 | B1 * | 3/2004 | Hayee et al. ..................... 398/65 |
| 6,819,872 | B2 | 11/2004 | Farries et al. |
| 7,865,080 | B2 * | 1/2011 | Hecker et al. .................. 398/65 |
| 2009/0060508 | A1 * | 3/2009 | Tanimura et al. .............. 398/65 |
| 2010/0034537 | A1 | 2/2010 | Zhang et al. |

FOREIGN PATENT DOCUMENTS

| EP | 0838913 | 4/1998 |
| JP | 2009-60461 | 3/2009 |

OTHER PUBLICATIONS

European Search Report issued Jun. 17, 2011, for corresponding European Patent Application No. 11155972.0.

* cited by examiner

*Primary Examiner* — Hanh Phan
(74) *Attorney, Agent, or Firm* — Staas & Halsey LLP

(57) ABSTRACT

A polarized-wave-multiplexing optical transmitter including: an optical combiner generating a polarized-wave-multiplexed optical signal by polarized-wave-multiplexing a first optical modulation signal and a second optical modulation signal; an optical power fluctuation portion fluctuating optical power of the first optical modulation signal and the second optical modulation signal periodically; a total-optical-power detection portion detecting fluctuation amount of total optical power of the polarized-wave-multiplexed optical signal; and an optical power controller reducing an optical power difference between the first optical modulation signal and the second optical modulation signal based on detection result of the total-optical-power detection portion.

8 Claims, 16 Drawing Sheets

POLARIZED-WAVE-MULTIPLEXING OPTICAL TRANSMITTER AND CONTROL METHOD OF POLARIZED-WAVE-MULTIPLEXED OPTICAL SIGNAL

CROSS-REFERENCE TO RELATED APPLICATION

This application is based upon and claims the benefit of priority of the prior Japanese Patent Application No. 2010-052583, filed on Mar. 10, 2010, the entire contents of which are incorporated herein by reference.

FIELD

A certain aspect of embodiments described herein relates to a polarized-wave-multiplexing optical transmitter and a control method of polarized-wave-multiplexed optical signal.

BACKGROUND

There is a demand for establishment of a high-speed optical transmitter. For this reason, a development of an optical transmitter adopting multilevel modulation method used in a wireless system is moving toward practical use. An optical transmitter adopting polarized-wave multiplexing technology and digital coherent receiving technology attracts an attention as a method for establishing a transmission system having large capacity and long distance.

In the polarized-wave multiplexing method, two data streams are transmitted with use of two polarized-waves crossing at right angle having an identical wavelength. Thus, the polarized-wave multiplexing technology reduces a modulation speed to half, and contributes to characteristics improvement of an electrical signal generation circuit, lower cost, downsizing, lower power consumption and so on. And, influence caused by quality degradation such as dispersion on a transmission path is reduced. Thus, characteristics of an optical transmitter are improved.

An optical transmitter generating a polarized-wave-multiplexed signal has a modulator with respect to each polarized-wave signal. There may be a case where the polarized-waves have optical power difference because of variation of characteristics between each modulator. And so, U.S. Pat. No. 6,819,872 (hereinafter referred to as Document 1) discloses a feedback control of optical power of each polarized-wave with use of a light-receiving element according to each polarized-wave.

However, the art of Document 1 detects optical power of each polarized-wave with use of two light-receiving elements. In this case, an initial adjustment is needed for reducing characteristics variation of the light-receiving elements and optical power difference appearing after an optical power controller. And, the art fails to compensate for aging fluctuation of the characteristics of the light-receiving elements and the optical power difference between each polarized-wave caused by aging fluctuation of optical combiner after the optical power controller.

SUMMARY

According to an aspect of the present invention, there is provided a polarized-wave-multiplexing optical transmitter including: an optical combiner generating a polarized-wave-multiplexed optical signal by polarized-wave-multiplexing a first optical modulation signal and a second optical modulation signal; an optical power fluctuation portion fluctuating optical power of the first optical modulation signal and the second optical modulation signal periodically; a total-optical-power detection portion detecting fluctuation amount of total optical power of the polarized-wave-multiplexed optical signal; and an optical power controller reducing an optical power difference between the first optical modulation signal and the second optical modulation signal based on detection result of the total-optical-power detection portion.

According to an aspect of the present invention, there is provided a control method of a polarized-wave-multiplexed optical signal comprising: generating a polarized-wave-multiplexed optical signal by polarized-wave-multiplexing a first optical modulation signal and a second optical modulation signal; periodically fluctuating optical power of the first optical modulation signal and the second optical modulation signal; detecting fluctuation amount of total optical power of the polarized-wave-multiplexed optical signal; and reducing optical power difference between the first optical modulation signal and the second optical modulation signal based on detection result of the detecting of the fluctuation amount.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

The following is a description of embodiments of the present invention, with reference to the accompanying drawings.

[a] First Embodiment

Figure 1:
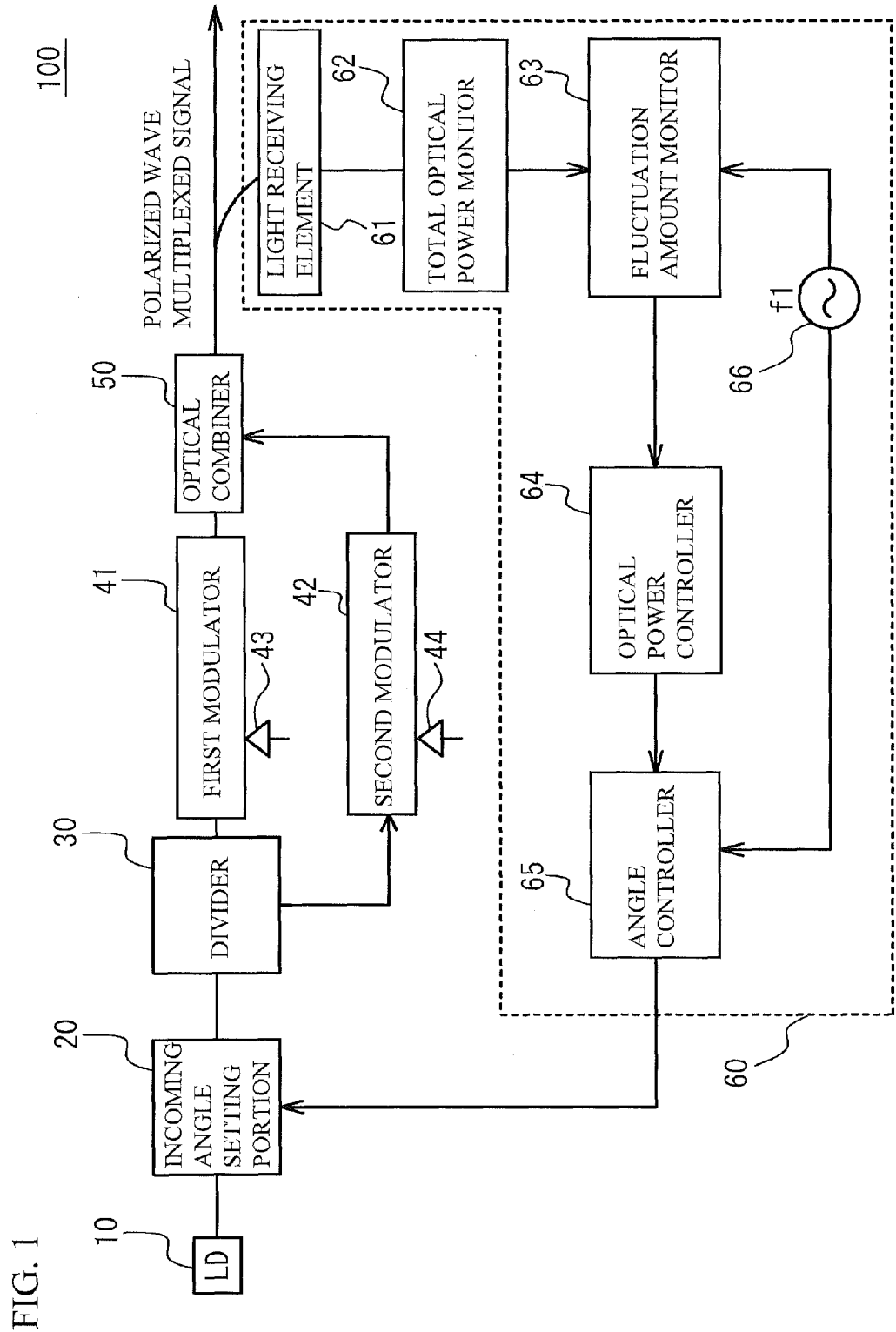
FIG. 1 illustrates a block diagram of an optical transmitter in accordance with a first embodiment.

FIG. 1 illustrates a block diagram of an optical transmitter 100 in accordance with a first embodiment. As illustrated in FIG. 1, the optical transmitter 100 has a light source 10, an incoming angle setting portion 20, a divider 30, a first modulator 41, a second modulator 42, an optical combiner 50, and a monitor 60. The monitor 60 has a light-receiving element 61, a total-optical-power monitor 62, a fluctuation amount monitor 63, an optical power controller 64, an angle controller 65 and a dither generation portion 66.

The light source 10 is, for example, a laser diode, and emits an optical signal having a predetermined wavelength. The optical signal is, for example, a continuous wave (CW) light. The incoming angle setting portion 20 receives an instruction from the angle controller 65 and changes an incoming angle of a polarized-wave.

The divider 30 divides an optical signal from the light source 10 into an X polarized-wave and a Y polarized-wave crossing at right angle to each other. The divider 30 is, for example, a polarization beam splitter (PBS). The first modulator 41 receives the X polarized-wave from the divider 30. The second modulator 42 receives the Y polarized-wave from the divider 30.

The first modulator 41 is a modulator modulating an optical signal according to a drive voltage applied by a driver 43 and outputs an optical modulation signal X (a first modulation signal). The second modulator 42 is a modulator modulating an optical signal according to a drive voltage applied by a driver 44 and outputs an optical modulation signal Y (a second modulation signal). The optical modulation signal X is transmitted with use of the X polarized-wave. The optical modulation signal Y is transmitted with use of the Y polarized-wave. The first modulator 41 and the second modulator 42 are, for example, a mach-zehnder type of $LiNbO_3$ modulator. The first modulator 41 and the second modulator 42 have only to generate a modulation signal. For example, a modulator structured with a semiconductor material using InP or the like may be used as the first modulator 41 and the second modulator 42.

Figure 2:
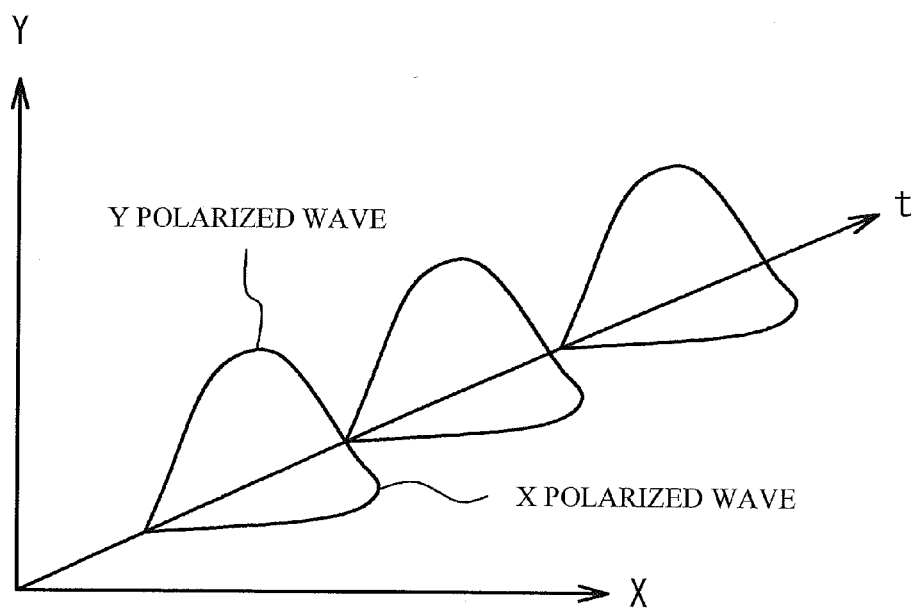
FIG. 2 illustrates a transmission of each polarized-wave.

The optical combiner 50 is a multiplexer multiplexing each polarized wave, and is, for example, a polarization beam combiner (PBC). In the embodiment, the optical combiner 50 generates a polarized-wave-multiplexed optical signal by multiplexing the optical modulation signal X and the optical modulation signal Y. Here, as illustrated in FIG. 2, the optical modulation signal X is transmitted with use of the X polarized-wave, and the optical modulation signal Y is transmitted with use of the Y polarized-wave.

The dither generation portion 66 generates a dither signal for slightly fluctuating an incoming angle of a polarized-wave periodically and inputs the dither signal into the angle controller 65 and the fluctuation amount monitor 63. Thus, the incoming angle of an optical signal into the divider 30 fluctuates at a frequency of the dither signal. In this case, the X polarized-wave and the Y polarized-wave are subjected to loss fluctuations having approximately the same absolute value and having an opposite sign. Thus, each optical power of the X polarized-wave and the Y polarized-wave is subjected to the dithering.

The light-receiving element 61 receives a part of the polarized-wave-multiplexed optical signal output from the optical combiner 50. The polarized-wave-multiplexed optical signal received by the light-receiving element 61 includes the X polarized-wave and the Y polarized-wave. Most of the polarized-wave-multiplexed optical signal output from the optical combiner 50 is output toward outside through an optical fiber or the like. The light-receiving element 61 is, for example, a photo diode, and outputs an electrical signal according to the optical power of the polarized-wave-multiplexed optical signal.

The total-optical-power monitor 62, the fluctuation amount monitor 63, the optical power controller 64 and the angle controller 65 are established with an execution of a software program by a processor. The total-optical-power monitor 62 detects total optical power of the polarized-wave-multiplexed optical signal output from the optical combiner 50 based on the electrical signal output from the light-receiving element 61. The total optical power is sum of each optical power of the X polarized-wave and the Y polarized-wave of the polarized-wave-multiplexed optical signal.

The fluctuation amount monitor 63 detects fluctuation amount of the total optical power. Here, the fluctuation amount of the total optical power is fluctuation amount of the total optical power appearing at every period of the dither signal generated by the dither generation portion 66. The fluctuation amount monitor 63 detects the fluctuation amount of the total optical power synchronously by extracting the frequency of the dither signal input from the dither generation portion 66.

The optical power controller 64 determines a target value of the incoming angle of the polarized-waves based on the detection result of the total-optical-power monitor 62 and the fluctuation amount monitor 63 so that an optical power difference between the X polarized-wave and the Y polarized-wave gets reduced. In concrete, the optical power controller 64 determines the target value of the incoming angle of the polarized-waves so that variation of the fluctuation amount of the total optical power during the dithering by the dither generation portion 66 is a predetermined value or lower. For example, variation of "fluctuation amount of total optical power"/"average of total optical power" is used as the variation of the fluctuation amount of the total optical power. "fluctuation amount of total optical power"/"average of total optical power" is obtained by normalizing the fluctuation amount of the total optical power by the average of the total optical power. The angle controller 65 controls the incoming angle setting portion 20 so that the incoming angle of the polarized-waves toward the divider 30 is the incoming angle of the polarized-waves determined by the optical power controller 64.

Figure 3:
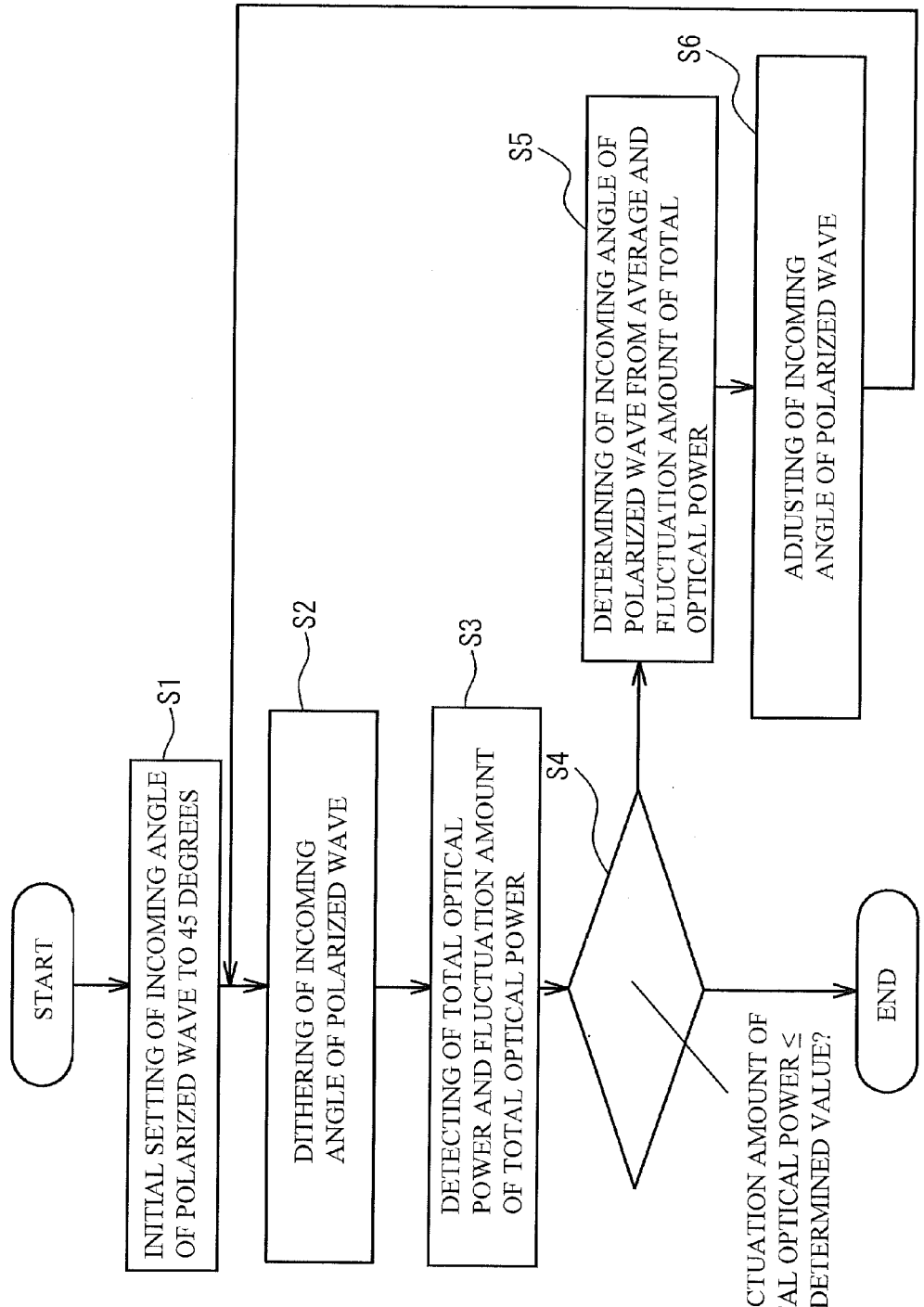
FIG. 3 illustrates a flowchart of an example of a control with a monitor.
Figure 4A:
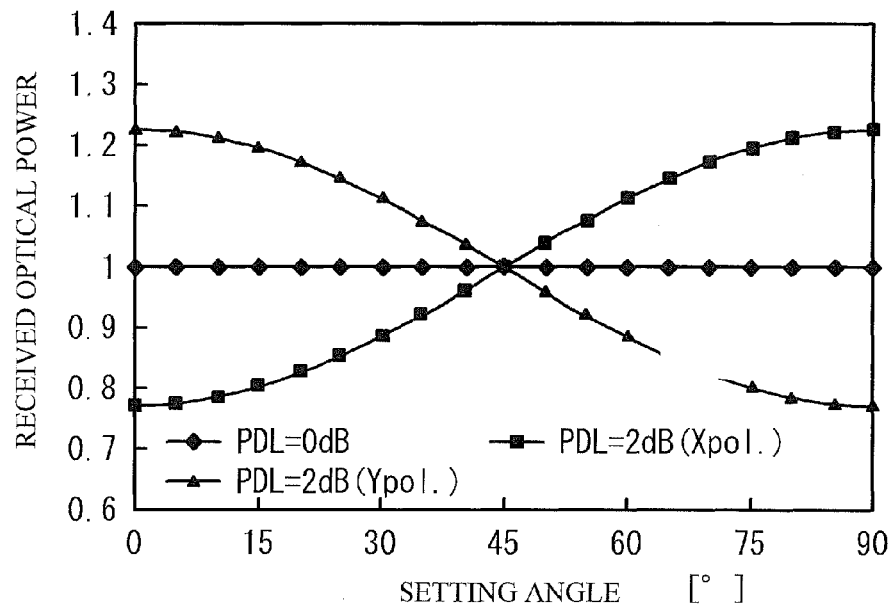
FIG. 4A illustrates an example of calculation result of a relation between an incoming angle of polarized-waves and optical power detected by a light-receiving element.
Figure 4B:
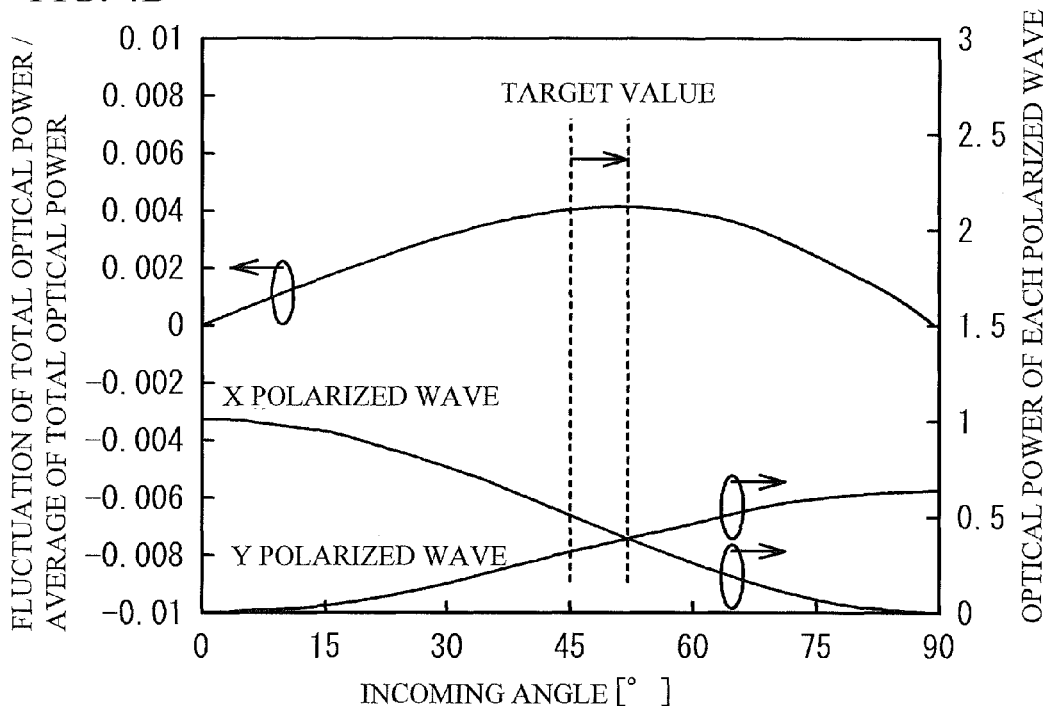
FIG. 4B illustrates an example of the incoming angle of the polarized-waves set by an angle controller.

A description will be given of a concrete example of the control with reference to FIG. 3, FIG. 4A and FIG. 4B. FIG. 3 illustrates a flowchart of an example of the control with the monitor 60. The flowchart of FIG. 3 may be executed at starting of the optical transmitter 100 or may be executed at a given period during the operation of the optical transmitter 100. FIG. 4A illustrates an example of calculation result of a relation between the incoming angle of the polarized-waves and the optical power detected by the light-receiving element 61. FIG. 4B illustrates an example of the incoming angle of the polarized-waves set by the angle controller 65.

A description will be given of a relation between the incoming angle of the polarized-waves and the optical power of each polarized-wave. FIG. 4A illustrates the optical power of the X polarized-wave, the optical power of the Y polarized-wave, and the total optical power in the case where the incoming angle of the polarized-waves fluctuates from 0 degree to 90 degrees. The X polarized-wave and the Y polarized-wave are an optical signal having a phase opposite to each other. Therefore, when the optical power of the X polarized-wave is equal to that of the Y polarized-wave at a reverse phase, the total optical power of the X polarized-wave and the Y polarized-wave is constant. However, when there is an optical power difference between the X polarized-wave and the Y polarized-wave, variation appears in the fluctuation amount of the total optical power during the fluctuation of the incoming angle of the polarized-waves. In the flowchart of FIG. 3, the optical power difference of the X polarized-wave and the Y polarized-wave is reduced based on the variation of the fluctuation amount.

As illustrated in FIG. 3, the angle controller 65 controls the incoming angle setting portion 20 so that the incoming angle of the polarized-waves toward the divider 30 is an initial value (for example 45 degrees) (Step S1). Thus, the incoming angle of the polarized-waves toward the divider 30 from the light source 10 is set to be an initial value.

Next, the dither generation portion 66 generates a dither signal for periodically fluctuating the incoming angle of the polarized-waves determined by the incoming angle setting portion 20, and inputs the generated dither signal into the angle controller 65 and the fluctuation amount monitor 63 (Step S2). Thus, the incoming angle of the polarized-waves fluctuates at the frequency of the dither signal.

Next, the total-optical-power monitor 62 detects the total optical power of the multiplexed-polarized-wave optical signal output from the optical combiner 50. The fluctuation amount monitor 63 detects the fluctuation amount of the total optical power of the multiplex-polarized-wave optical signal output from the optical combiner 50 (Step S3).

Next, the optical power controller 64 determines whether the fluctuation amount of the total optical power is a predetermined value or lower (Step S4). The predetermined value may be near zero. If it is determined "Yes" in Step S4, the flowchart is terminated.

If it is determined "no" in Step S4, the optical power controller 64 sets the incoming angle of the polarized-waves so that the variation of "fluctuation amount of total optical power"/"average of total optical power" is zero or near zero (Step S5). In concrete, the optical power controller 64 sets the incoming angle of the polarized-waves so that a gradient of "fluctuation amount of total optical power"/"average of total optical power" is zero or near zero in FIG. 4B. In this case, the optical power of the X polarized-wave corresponds to that of the Y polarized-wave, as illustrated in FIG. 4B.

After that, the angle controller 65 controls the incoming angle setting portion 20 so that the incoming angle of the polarized-waves toward the divider 30 from the light source 10 is the incoming angle of the polarized-waves set in Step S5 (Step S6). After that, Step S2 is executed.

With the control of the incoming angle of the polarized-waves, the optical power difference between the X polarized-wave and the Y polarized-wave is reduced with high accuracy. Thus, the degradation of transmission characteristics is restrained. It is not necessary to use a plurality of light-receiving elements because the total optical power is detected with only one light-receiving element. The initial adjustment for reducing the characteristics variation of light receiving elements and the optical power difference between each polarized-wave appearing after the divider 30 may not be needed. And, it is possible to compensate for the characteristics variation of light receiving elements and the optical power difference between each polarized-waves caused by aging fluctuation of the optical power difference between each polarized-wave appearing after the divider 30.

Figure 5:
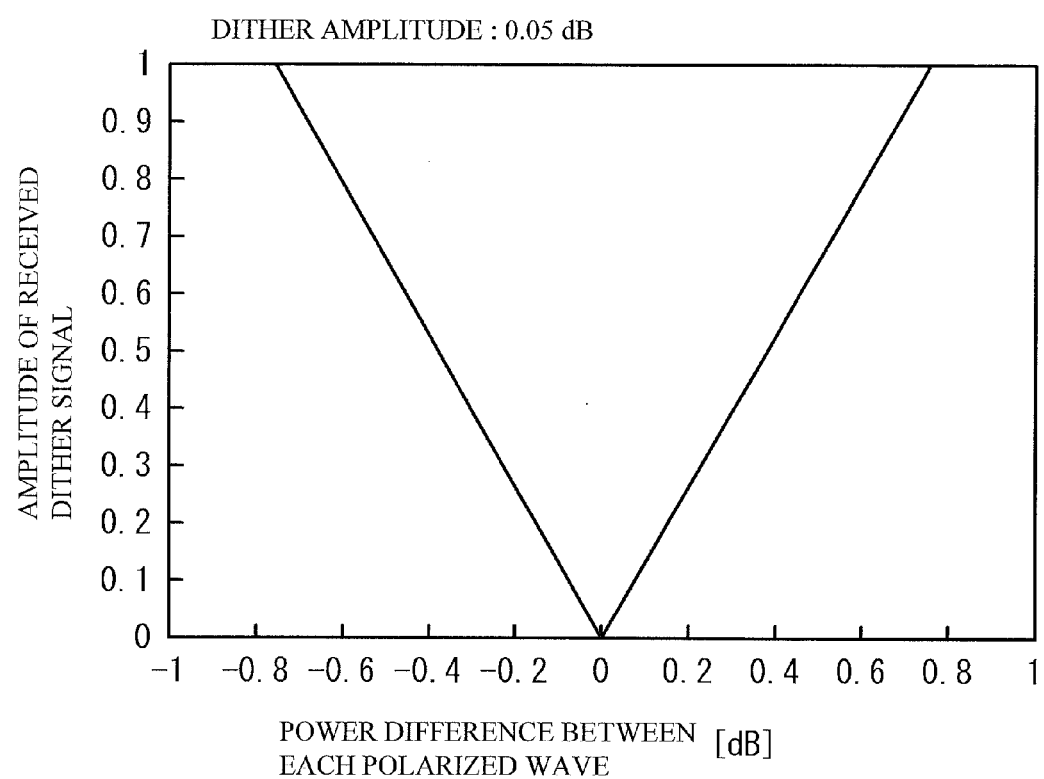
FIG. 5 illustrates a calculation example of optical power difference between each polarized-wave in a case where a dither signal is used.

FIG. 5 illustrates a calculation example of the optical power difference between each polarized-wave in the case where the dither signal is used. The dither signal may have a frequency of 23 MHz (Bit Rate=31.5 Gbps) and dither amplitude of 0.05 dB. In this case, as illustrated in FIG. 5, the optical power difference between each polarized-wave was reduced to approximately 0.1 dB with approximately $\frac{1}{10}$ sensitivity of an automatic bias control of a LN modulator.

First Modified Embodiment

Figure 6:
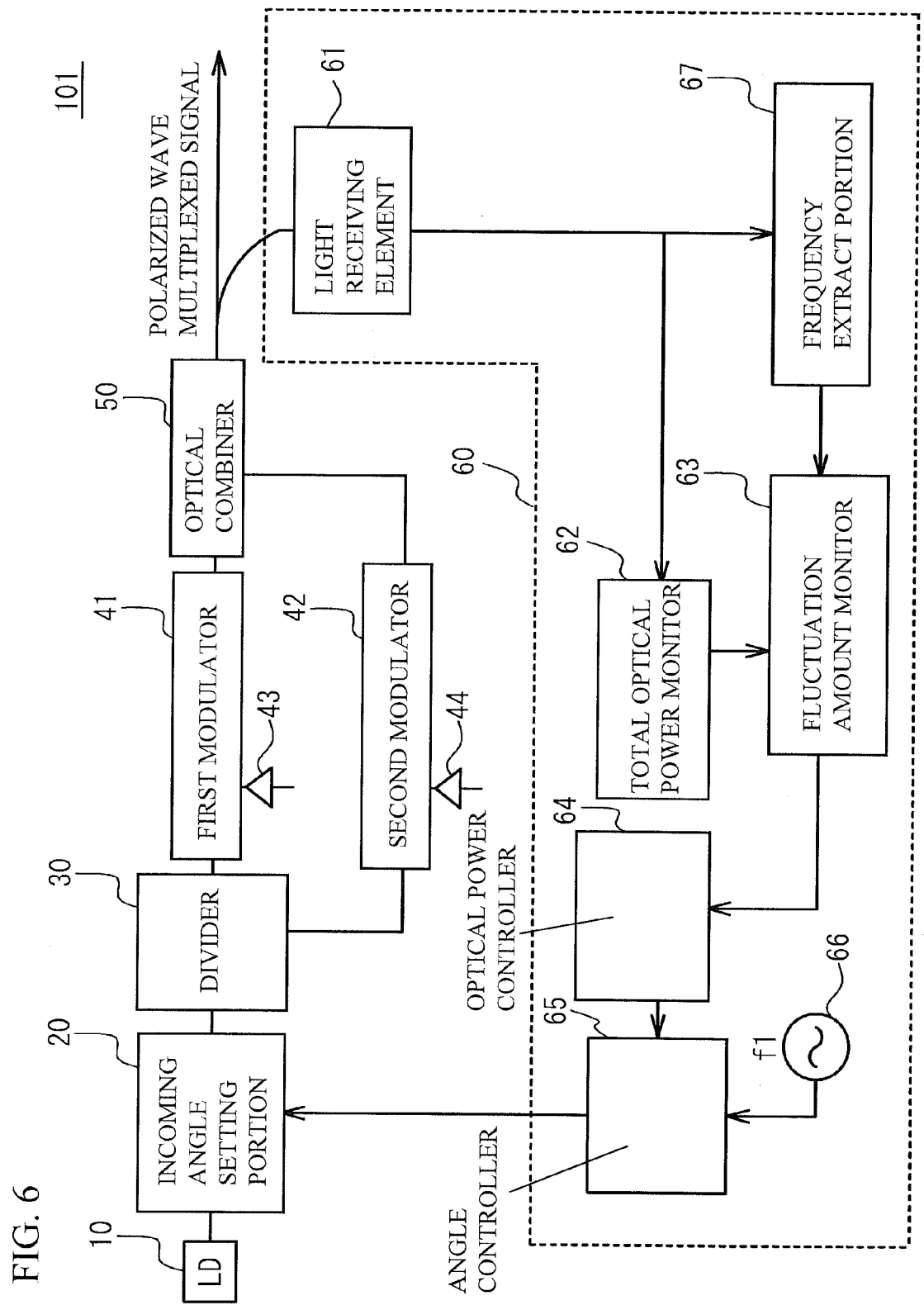
FIG. 6 illustrates a block diagram of an optical transmitter in accordance with a first modified embodiment of the first embodiment.

FIG. 6 illustrates a block diagram of an optical transmitter 101 in accordance with a first modified embodiment of the first embodiment. As illustrated in FIG. 6, the optical transmitter 101 is different from the optical transmitter 100 of FIG. 1 in a point that a frequency extract portion 67 is further provided. A frequency filter or the like may be used as the frequency extract portion 67.

In the modified embodiment, the dither signal generated by the dither generation portion 66 is not input into the fluctuation amount monitor 63. Alternatively, the frequency extract portion 67 extracts a fluctuation frequency of the total optical power and obtains the frequency of the dither signal generated by the dither generation portion 66. The fluctuation amount monitor 63 detects the fluctuation amount of the total optical power based on the frequency of the dither signal obtained by the frequency extract portion 67.

The fluctuation amount of the total optical power based on the frequency of the dither signal may be detected without inputting of the dither signal generated by the dither generation portion 66 into the fluctuation amount monitor 63.

Second Modified Embodiment

Figure 7:
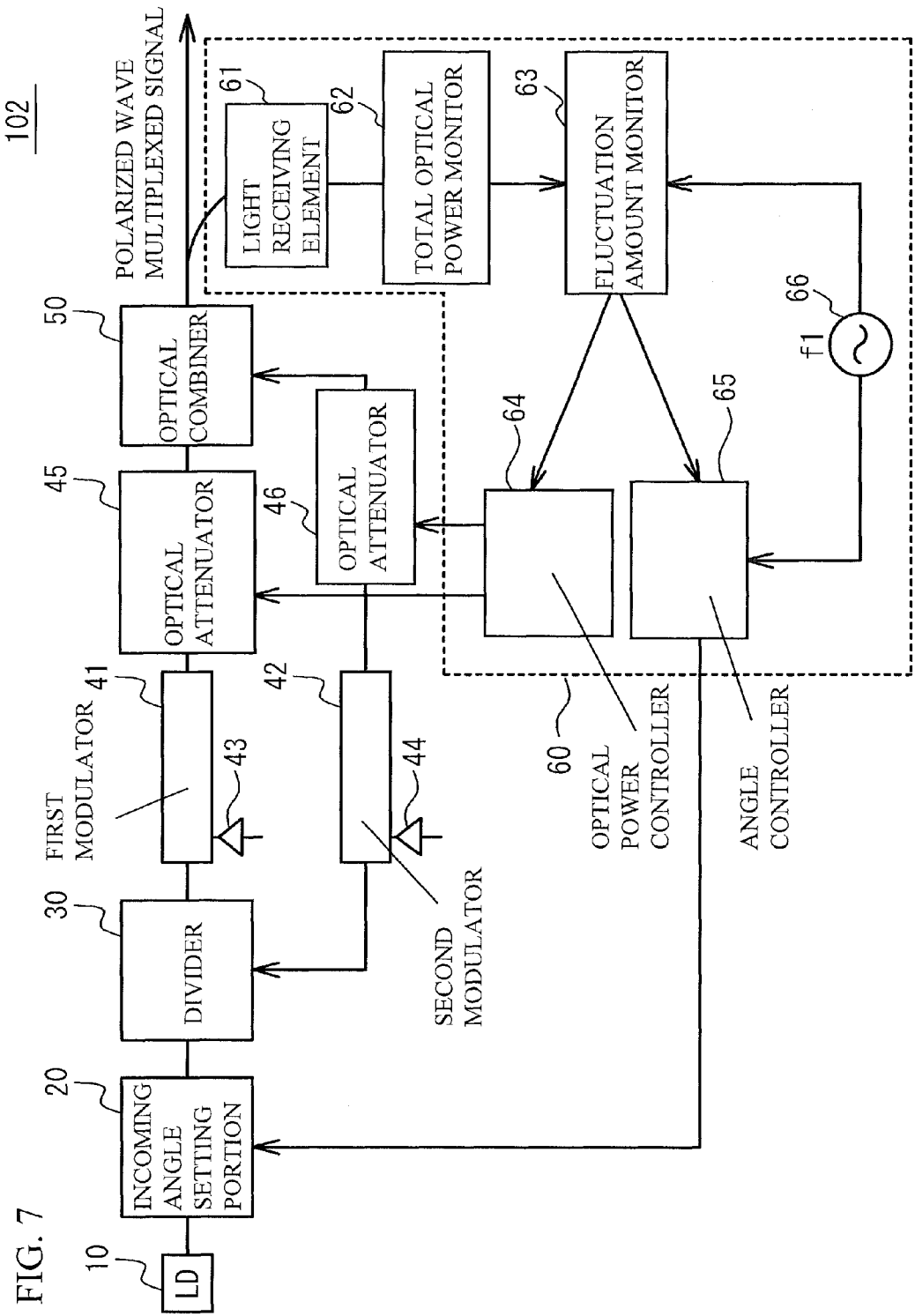
FIG. 7 illustrates a block diagram of an optical transmitter in accordance with a second modified embodiment of the first embodiment.

FIG. 7 illustrates a block diagram of an optical transmitter 102 in accordance with a second modified embodiment of the first embodiment. As illustrated in FIG. 7, the optical transmitter 102 is different from the optical transmitter 100 of FIG. 1 in a point that a first optical attenuator 45 and a second optical attenuator 46 are further provided. The first optical attenuator 45 is provided between the first modulator 41 and the optical combiner 50. The second optical attenuator 46 is provided between the second modulator 42 and the optical combiner 50.

The dither generation portion 66 generates a dither signal for periodically fluctuating the incoming angle of the polarized-waves determined by the incoming angle setting portion 20 and inputs the dither signal into the angle controller 65 and the fluctuation amount monitor 63. Thus, the incoming angle of the polarized-waves fluctuates with the frequency of the dither signal. In this case, the X polarized-wave and the Y polarized-wave are subjected to approximately same loss fluctuation having opposite sign.

The optical power controller 64 controls the first optical attenuator 45 and the second optical attenuator 46 based on the detection result of the total-optical-power monitor 62 and the fluctuation amount monitor 63 so that the optical power difference between the X polarized-wave and the Y polarized-wave is reduced. In concrete, the optical power controller 64 controls the first optical attenuator 45 and the second optical attenuator 46 so that the variation of the fluctuation amount of the total optical power during the dithering by the dither generation portion 66 is a predetermined value or lower. For example, "fluctuation amount of total optical power"/"average of total optical power" may be used as the variation of the fluctuation amount of the total optical power.

With the second modified embodiment, the optical power difference between the X polarized-wave and the Y polarized-wave is reduced without changing of the incoming angle of the polarized-waves.

The dither generation portion 66 acts as an optical power fluctuation portion for periodically fluctuating optical power of a first modulation signal and a second modulation signal.

[b] Second Embodiment

Figure 8:
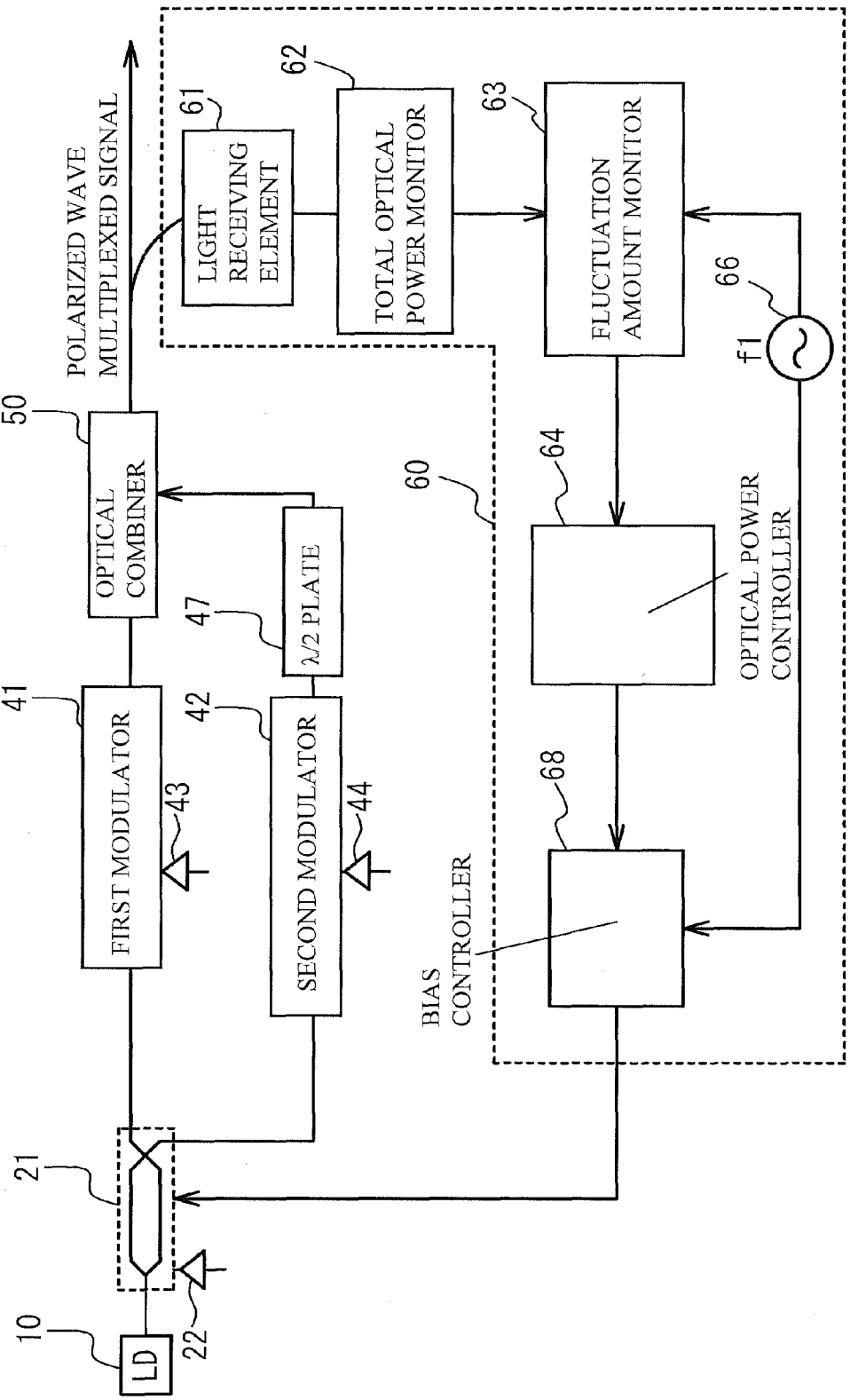
FIG. 8 illustrates a block diagram of an optical transmitter in accordance with a second embodiment.

FIG. 8 illustrates a block diagram of an optical transmitter 103 in accordance with a second embodiment. As illustrated in FIG. 8, the optical transmitter 103 is different from the optical transmitter 100 in points that a RZ modulator 21 and a driver 22 are provided instead of the incoming angle setting portion 20 and the divider 30, a bias controller 68 is provided instead of the angle controller 65, and a 212 plate 47 is provided between the second modulator 42 and the optical combiner 50.

The RZ modulator 21 outputs a RZ modulation signal according to the driving voltage applied by the driver 22. The bias controller 68 applies a bias to the RZ modulator 21. Thus, the RZ modulation signal may be shifted toward plus side or toward minus side. A normal phase signal is output from a normal phase outputting port of the RZ modulator 21 and is input into the first modulator 41. A reversed phase signal is output from a reversed phase outputting port of the RZ modulator 21 and is input into the second modulator 42. The second modulator 42 inputs the reversed phase signal into the λ/2 plate 47. The λ/2 plate 47 rotates the polarized-wave condition of the reversed signal by 90 degrees. Thus, an output signal of the first modulator 41 acts as the X polarized-wave (the optical modulation signal X), and an output signal of the second modulator 42 acts as the Y polarized-wave (the optical modulation signal Y). The λ/2 plate 47 may be arranged on any position of a transmission path from the RZ modulator 21 to the optical combiner 50 via the second modulator 42.

The dither generation portion 66 generates a dither signal for periodically fluctuating the bias applied to the RZ modulator 21, and inputs the dither signal into the bias controller 68 and the fluctuation amount monitor 63. Thus, the duty ratio of the RZ modulator 21 fluctuates at the frequency of the dither signal. In this case, the X polarized-wave and the Y polarized-wave are subjected to approximately same loss fluctuation having opposite sign.

In the second embodiment, the optical power controller 64 controls the bias controller 68 based on the detection result of the total-optical-power monitor 62 and the fluctuation amount monitor 63 so that the optical power difference between the X polarized-wave and the Y polarized-wave is reduced. In concrete, the optical power controller 64 controls the bias controller 68 so that the variation of the fluctuation amount of the total optical power during the dithering by the dither generation portion 66 is a predetermined value or lower. For example, the variation of "fluctuation amount of total optical power"/"average of total optical power" may be used as the variation of the fluctuation amount of the total optical power.

In accordance with the second embodiment, the optical power difference between the X polarized-wave and the Y polarized-wave may be reduced with use of the normal phase signal and the reversed phase signal output from the RZ modulator.

In the embodiment, the λ/2 plate 47 is used as a component for rotating a polarized-wave condition by 90 degrees. However, the structure is not limited. Another polarized-wave rotator such as a Faraday rotator may be used as the component for rotating a polarized-wave condition by 90 degrees. In the following embodiments, another polarized-wave rotator may be used instead of the λ/2 plate 47.

Modified Embodiment

Figure 9:
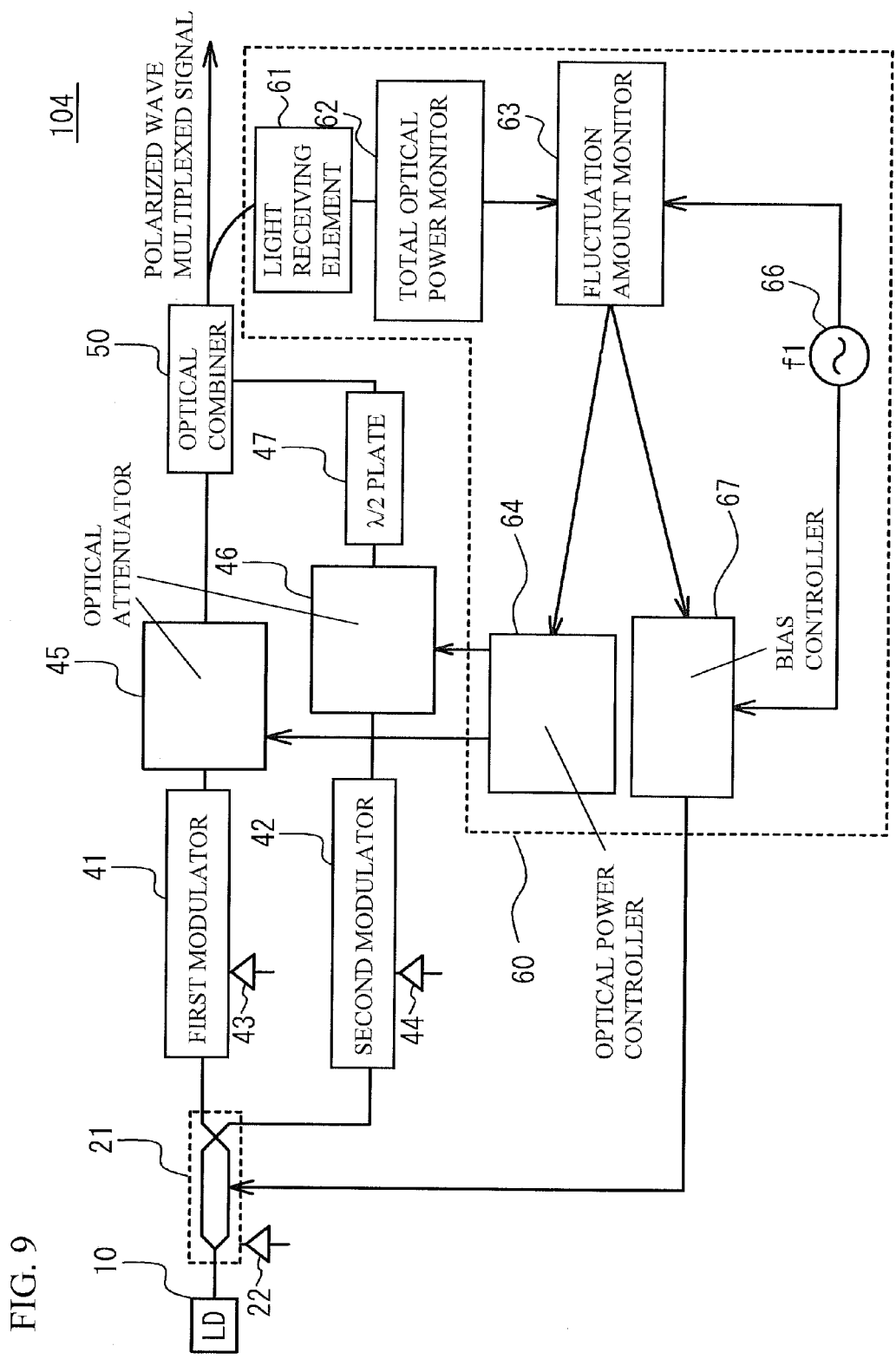
FIG. 9 illustrates a block diagram of an optical transmitter in accordance with a modified embodiment of the second embodiment.

FIG. 9 illustrates a block diagram of an optical transmitter 104 in accordance with a modified embodiment of the second embodiment. As illustrated in FIG. 9, the optical transmitter 104 is different from the optical transmitter 103 of FIG. 8, in a point that the first optical attenuator 45 and the second optical attenuator 46 are further provided. The first optical attenuator 45 is provided between the first modulator 41 and the optical combiner 50. The second optical attenuator 46 is provided between the second modulator 42 and the optical combiner 50.

The dither generation portion 66 generates a dither signal for periodically fluctuating the bias applied to the RZ modulator 21 and inputs the dither signal into the bias controller 68 and the fluctuation amount monitor 63. Thus, the duty ratio of the RZ modulator 21 fluctuates at the frequency of the dither signal. In this case, the X polarized-wave and the Y polarized-wave are subjected to approximately same fluctuation amount having opposite sign.

The optical power controller 64 controls the first optical attenuator 45 and the second optical attenuator 46 based on the detection result of the total-optical-power monitor 62 and the fluctuation amount monitor 63 so that the optical power difference between the X polarized-wave and the Y polarized-wave is reduced. In concrete, the optical power controller 64 controls the first optical attenuator 45 and the second optical attenuator 46 so that the variation of the fluctuation amount of the total optical power during the dithering by the dither generation portion 66 is a predetermined value or lower. For example, the variation of "fluctuation amount of total optical power"/"average of total optical power" may be used as the variation of the fluctuation of total optical power.

In accordance with the modified embodiment, the optical power difference between the X polarized-wave and the Y polarized-wave may be reduced without changing of the bias applied to the RZ modulator 21.

In the second embodiment, the dither generation portion 66 acts as an optical power fluctuation portion for periodically fluctuating the optical power of the first modulation signal and the second modulation signal.

[c] Third Embodiment

Figure 10:
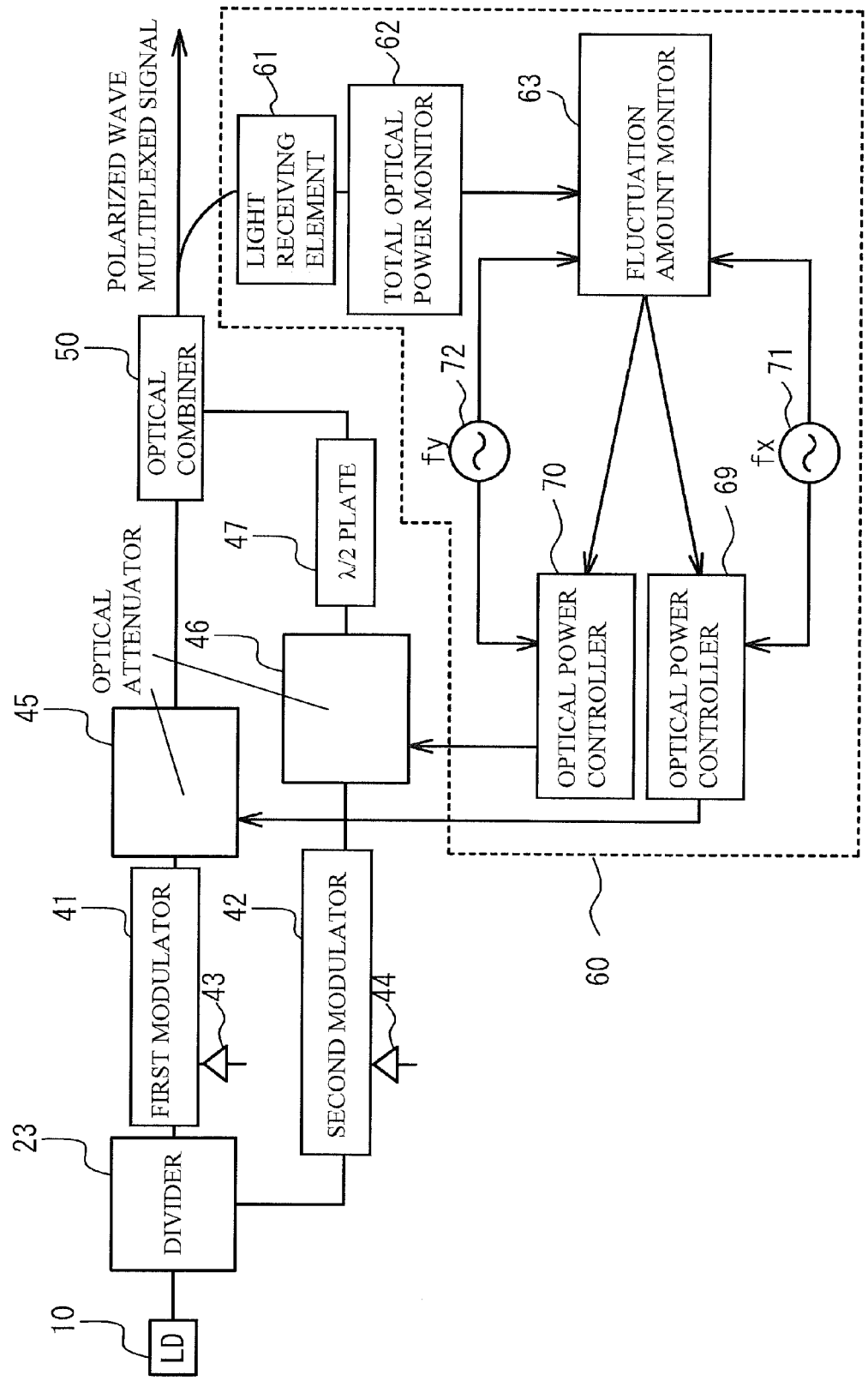
FIG. 10 illustrates a block diagram of an optical transmitter in accordance with a third embodiment.

FIG. 10 illustrates a block diagram of an optical transmitter 105 in accordance with a third embodiment. As illustrated in FIG. 10, the optical transmitter 105 is different from the optical transmitter 100 of FIG. 1 in points that an optical divider 23 is provided instead of the incoming angle setting portion 20 and the divider 30, a first optical power controller 69 and a second optical power controller 70 are provided instead of the optical power controller 64 and the angle controller 65, a first dither generation portion 71 and a second dither generation portion 72 are provided instead of the dither generation portion 66, and the first optical attenuator 45, the second optical attenuator 46 and the λ/2 plate 47 are further provided. The first optical attenuator 45 is provided between the first modulator 41 and the optical combiner 50. The second optical attenuator 46 is provided between the second modulator 42 and the optical combiner 50. The λ/2 plate 47 is provided between the second optical attenuator 46 and the optical combiner 50.

The optical divider 23 is a beam splitter or the like, divides the output sight of the light source 10 into two optical signals, and inputs the two optical signals into the first modulator 41 and the second modulator 42 respectively. In the embodiment, the optical divider 23 divides the output signal of the light source 10 so that optical power input into the first modulator 41 is the same as that into the second modulator 42. The output signal of the second modulator 42 is input into the λ/2 plate 47 through the second optical attenuator 46. The λ/2 plate 47 rotates the polarized-wave condition of the optical signal input thereinto. Thus, an output signal of the first modulator 41 acts as the X polarized-wave (the optical modulation signal X), and an output signal of the second modulator 42 acts as the Y polarized-wave (the optical modulation signal Y).

The first dither generation portion 71 inputs a dither signal X of frequency fx into the first optical power controller 69 and the fluctuation amount monitor 63. The first optical power controller 69 fluctuates optical attenuation amount at the first optical attenuator 45 at the frequency fx. The second dither generation portion 72 inputs a dither signal Y of frequency fy into the second optical power controller 70 and the fluctuation amount monitor 63. The second optical power controller 70 fluctuates optical attenuation amount at the second optical attenuator 46 at the frequency fy.

In the embodiment, the optical attenuation amount at the first optical attenuator 45 and the second optical attenuator 46 is dithered by time division. Thus, the optical attenuation amount of the first optical attenuator 45 and the second optical attenuator 46 fluctuates alternately.

The first optical power controller 69 and the second optical power controller 70 control the first optical attenuator 45 and the second optical attenuator 46 based on the detection result of the total-optical-power monitor 62 and the fluctuation amount monitor 63 so that the optical power difference between the X polarized-wave and the Y polarized-wave is reduced. In concrete, the first optical power controller 69 and the second optical power controller 70 control the first optical attenuator 45 and the second optical attenuator 46 so that the variation of the fluctuation amount of the total optical power during the dithering by the first dither generation portion 71 and the second dither generation portion 72 is a predetermined value or lower. For example, the variation of "fluctuation amount of total optical power"/"average of total optical power" may be used as the variation of the fluctuation amount of the total optical power.

Figure 11:
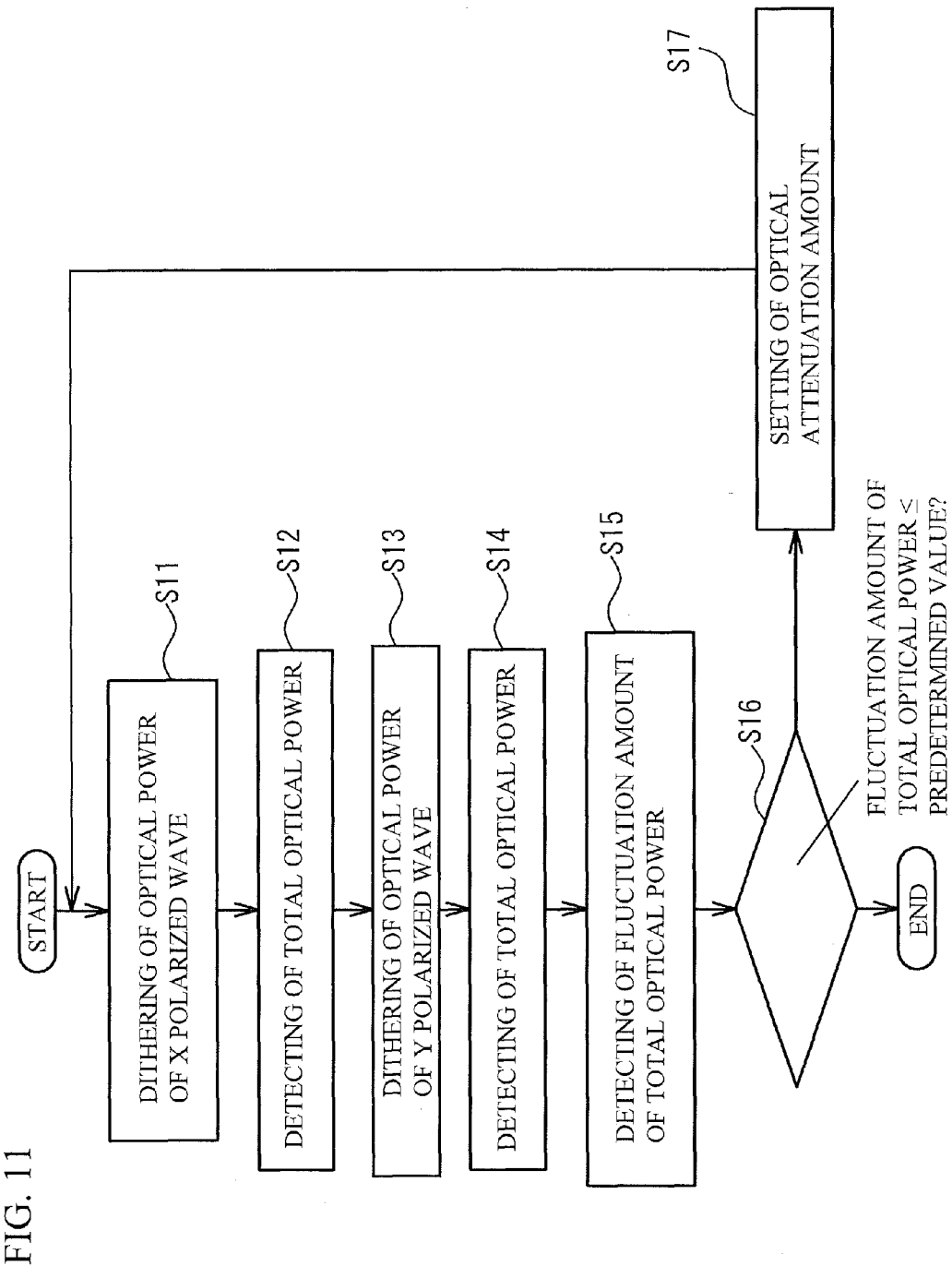
FIG. 11 illustrates a flowchart for describing an example of a control by a monitor.
Figure 12A:
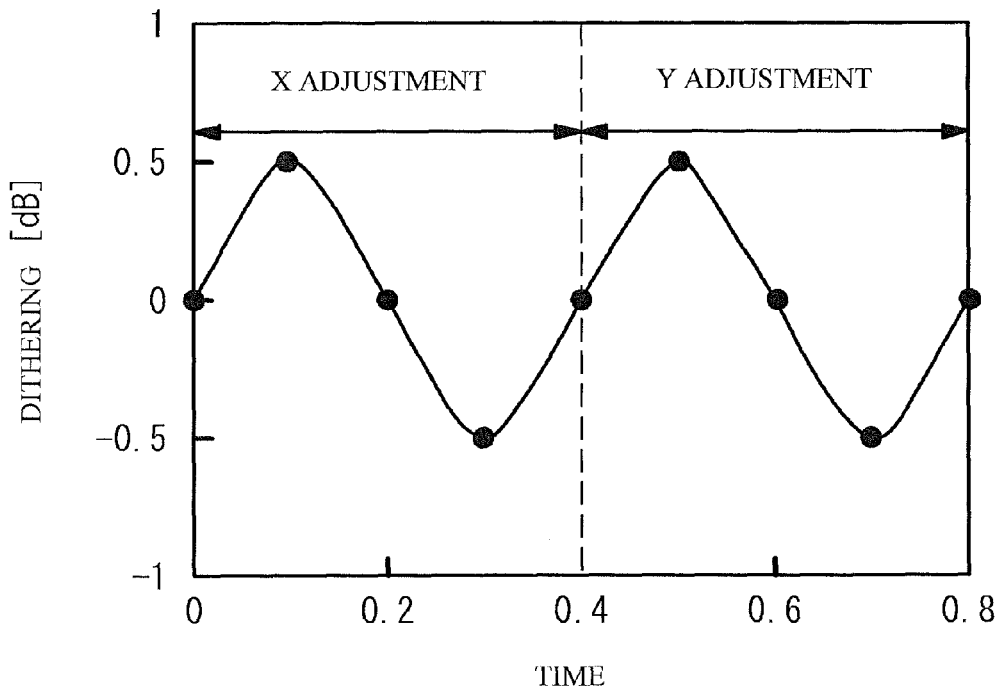
FIG. 12A illustrates a dithering to a first optical attenuator and a second optical attenuator.
Figure 12B:
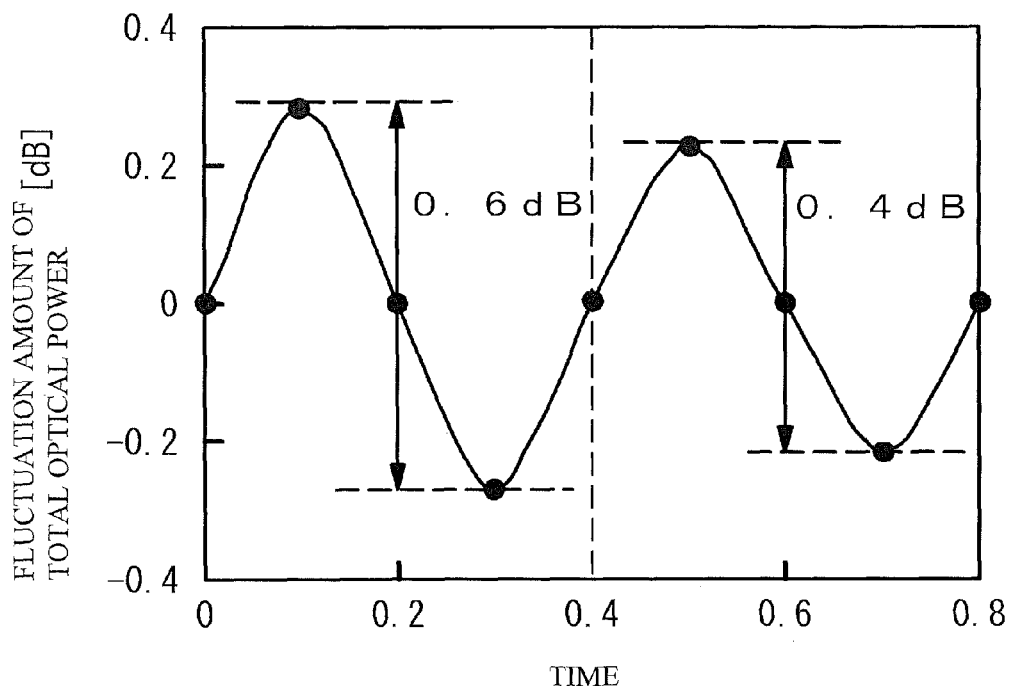
FIG. 12B illustrates fluctuation amount of total optical power obtained as a result of the dithering of FIG. 12A.

A description will be given of a concrete example with reference to FIG. 11, FIG. 12A and FIG. 12B. FIG. 11 illustrates a flowchart for describing an example of a control by the monitor 60. The flowchart of FIG. 11 may be executed at a starting of the optical transmitter 105 or may be executed at a given period during the operation of the optical transmitter 105. FIG. 12A illustrates a dithering to the first optical attenuator 45 and the second optical attenuator 46. FIG. 12B illustrates the fluctuation amount of the total optical power obtained as a result of the dithering of FIG. 12A.

As illustrated in FIG. 11, the first dither generation portion 71 inputs a dither signal X of frequency fx into the first optical attenuator 45 (Step S11). Thus, the optical attenuation amount at the first optical attenuator 45 fluctuates at the frequency fx, and the optical power of the X polarized-wave is dithered. In FIG. 12A, the fluctuation amount of the dither signal X is plus minus 0.5 dB, and loss at the first optical attenuator 45 reaches 9 dB as a result. Next, the total-optical-power monitor 62 detects the total optical power of the multiplexed-polarized-wave optical signal output from the optical combiner 50 (Step S12).

Next, the second dither generation portion 72 inputs a dither signal Y of frequency fy into the second optical attenuator 46 (Step S13). Thus, the optical attenuation amount at the second optical attenuator 46 fluctuates at the frequency fy, and the Y polarized-wave is dithered. In FIG. 12 A, the fluctuation amount of the dither signal Y is plus minus 0.5 dB, and loss at the second optical attenuator 46 reaches 10 dB as a result. Next, the total-optical-power monitor 62 detects the total optical power of the multiplexed-polarized-wave optical signal output from the optical combiner 50 (Step S14).

Next, the fluctuation amount monitor 63 detects the fluctuation amount of the total optical power of the optical modulation signal X and the optical modulation signal Y (Step S15). FIG. 12B illustrates a case where the fluctuation amount of the total optical power is 0.6 dB as a result of the dithering to the X polarized-wave, and the fluctuation amount of the total optical power is 0.4 dB as a result of the dithering to the Y polarized-wave.

Next, the first optical power controller 69 and the second optical power controller 70 determine whether the fluctuation amount of the total optical power obtained in Step S15 is a predetermined value or lower (Step S16). The predetermined value may be zero or near zero. If it is determined "yes" in Step S16, the flowchart is terminated.

If it is determined "no" in Step S16, the first optical power controller 69 and the second optical power controller 70 set optical attenuation amount of the first optical attenuator 45 and the second optical attenuator 46 so that variation of the fluctuation amount of the total optical power obtained in Step S15 is zero or near zero (Step S17). The variation of the fluctuation amount of the total optical power is a difference between the fluctuation amount of the total optical power obtained through the dithering to the X polarized-wave and the fluctuation amount of the total optical power obtained through the dithering to the Y polarized-wave. After that, step S11 is executed.

With the control of the optical attenuation amount, the optical power difference between the X polarized-wave and the Y polarized-wave may be reduced. Thus, the degradation of the transmission characteristics is restrained.

The optical attenuation amount of the first optical attenuator 45 and that of the second optical attenuator 46 may fluctuate at the same time with a half phase cycle difference. In this case, the optical attenuation amount of the first optical attenuator 45 fluctuates together with that of the second optical attenuator 46.

Figure 13A:
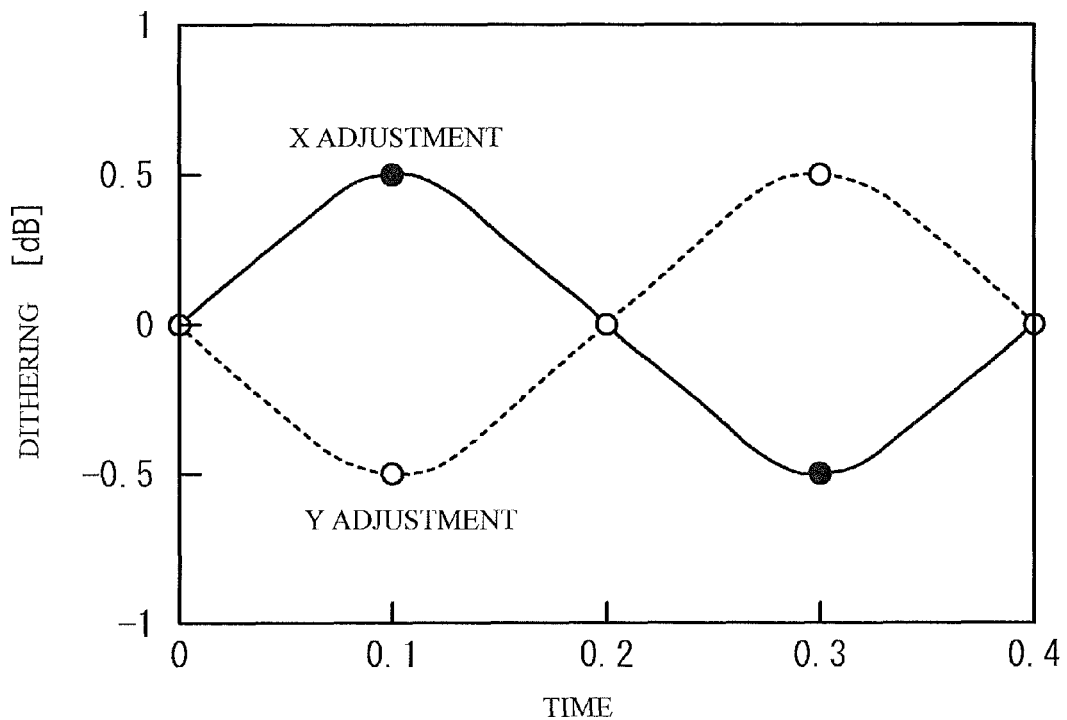
FIG. 13A illustrates a condition of a case where optical attenuation amount of a first optical attenuator and that of a second optical attenuator fluctuate at the same time at opposite phase.
Figure 13B:
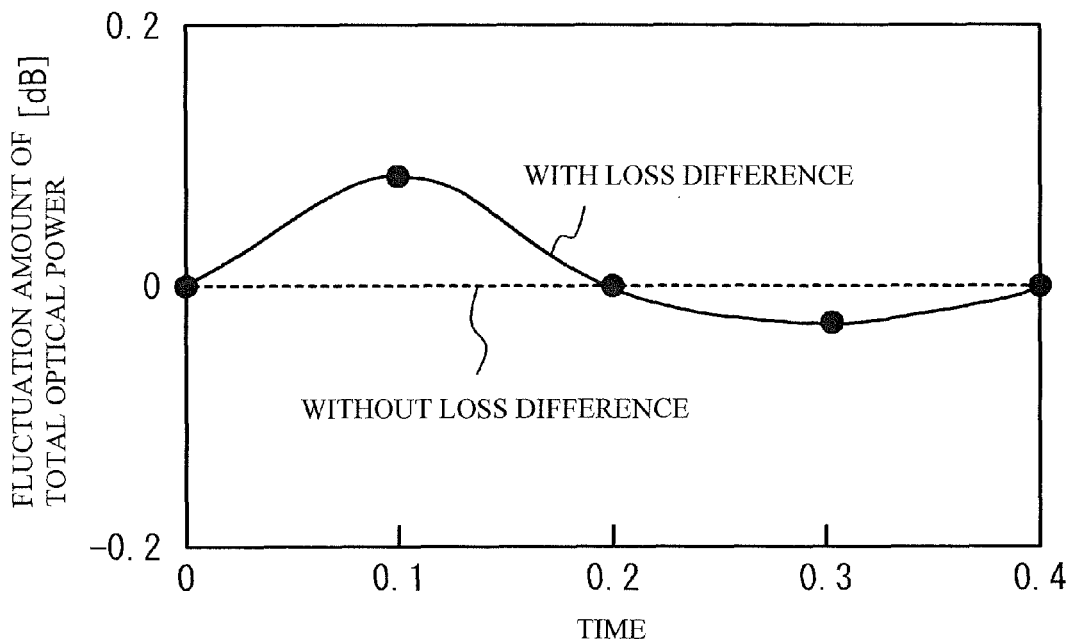
FIG. 13B illustrates fluctuation amount of total optical power of a case where the above-mentioned loss appears.

FIG. 13A illustrates a condition of a case where the optical attenuation amount of the first optical attenuator 45 and that of the second optical attenuator 46 fluctuate at the same time at opposite phase. In FIG. 13A, the fluctuation amount of the dither signal X and the dither signal Y is plus minus 0.5 dB. Thereby, the loss at the first optical attenuator 45 is 9 dB, and the loss at the second optical attenuator 46 is 10 dB. FIG. 13B illustrates the fluctuation amount of the total optical power of the case where the above-mentioned loss appears.

The variation of the fluctuation amount of the total optical power may be detected even if the optical attenuation amount of the first optical attenuator 45 and the second optical attenuator 46 are subjected to the dithering at the same time. Thus, the optical power difference between the X polarized-wave and the Y polarized-wave may be reduced.

In the third embodiment, the first dither generation portion 71 and the second dither generation portion 72 act as an optical power fluctuation portion for periodically fluctuating the optical power of the first modulation signal and the second modulation signal.

[d] Fourth Embodiment

Figure 14:
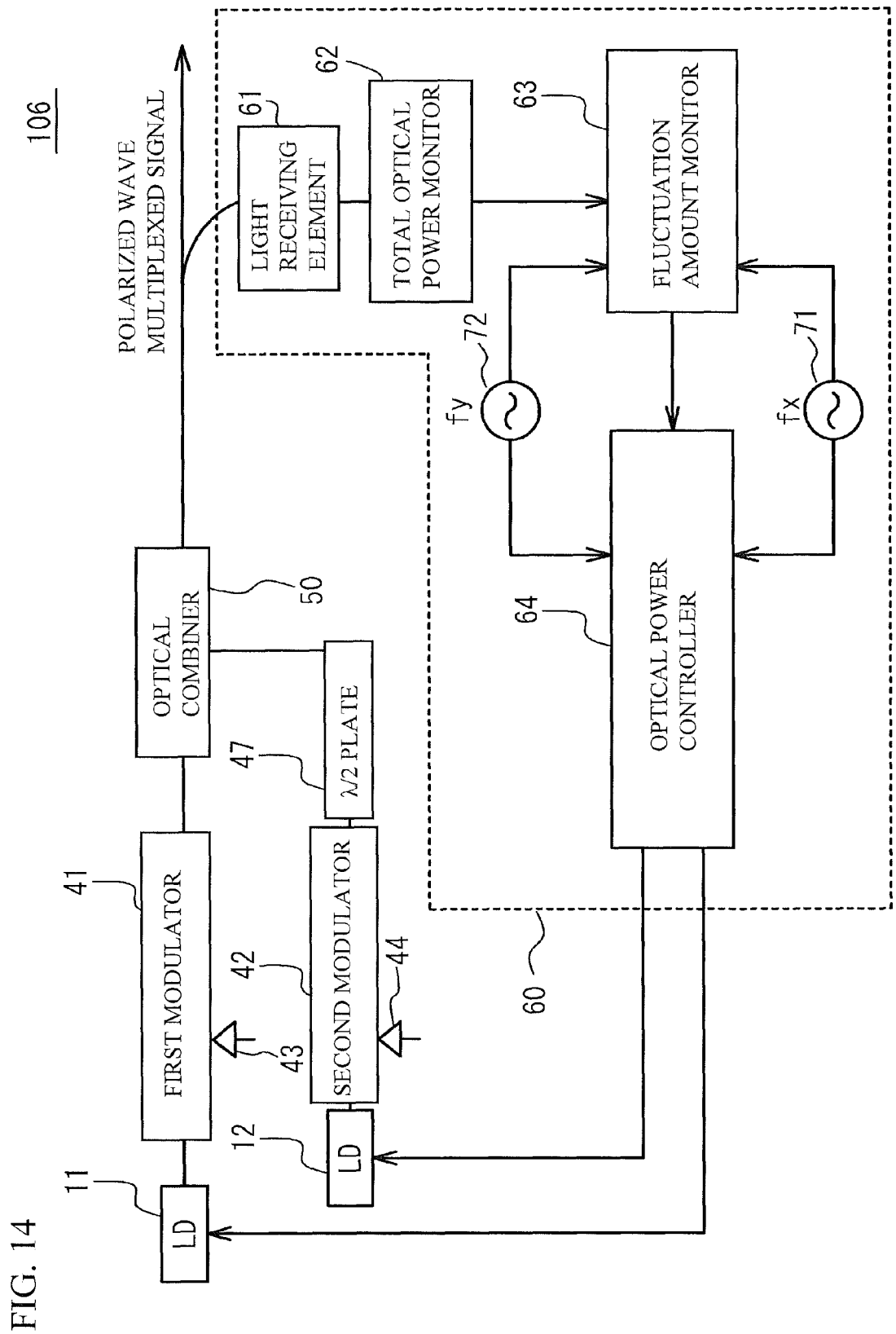
FIG. 14 illustrates a block diagram of an optical transmitter in accordance with a fourth embodiment.

FIG. 14 illustrates a block diagram of an optical transmitter 106 in accordance with a fourth embodiment. As illustrated in FIG. 14, the optical transmitter 106 is different from the optical transmitter 100 in points that a first light source 11 and a second light source 12 are provided instead of the light source 10, the λ/2 plate 47 is further provided, and the first dither generation portion 71 and the second dither generation portion 72 are provided instead of the dither generation portion 66. The optical transmitter 106 does not have the incoming angle setting portion 20, the divider 30 or the angle controller 65.

The first light source 11 and the second light source 12 have the same structure as the light source 10. The first modulator 41 receives an output light of the first light source 11. The second modulator 42 receives an output light of the second light source 12. The λ/2 plate 47 is provided on one of the paths from the first light source 11 to the optical combiner 50 and from the second light source 12 to the optical combiner 50. Thus, the optical combiner 50 receives two polarized-waves at right angle (the X polarized-wave and the Y polarized-wave).

The first dither generation portion 71 inputs a dither signal X of frequency fx into the optical power controller 64 and the fluctuation amount monitor 63. The second dither generation portion 72 inputs a dither signal Y of frequency fy into the optical power controller 64 and the fluctuation amount monitor 63. The optical power controller 64 performs a dithering by fluctuating output power of the first light source 11 at the frequency fx of the dither signal X. And, the optical power controller 64 performs a dithering by fluctuating output power of the second light source 12 at the frequency fy of the dither signal Y.

The optical power controller 64 controls the first light source 11 and the second light source 12 based on the detection result of the total-optical-power monitor 62 and the fluctuation amount monitor 63 so that the optical power difference between the X polarized-wave and the Y polarized-wave is reduced. In concrete, the optical power controller 64 controls the first light source 11 and the second light source 12 so that the variation of the fluctuation amount of the total optical power during the dithering by the first dither generation portion 71 and the second dither generation portion 72 is a predetermined value or lower. For example, the variation of "fluctuation amount of total optical power"/"average of total optical power" may be used as the variation of the fluctuation amount of the total optical power.

Modified Embodiment

Figure 15:
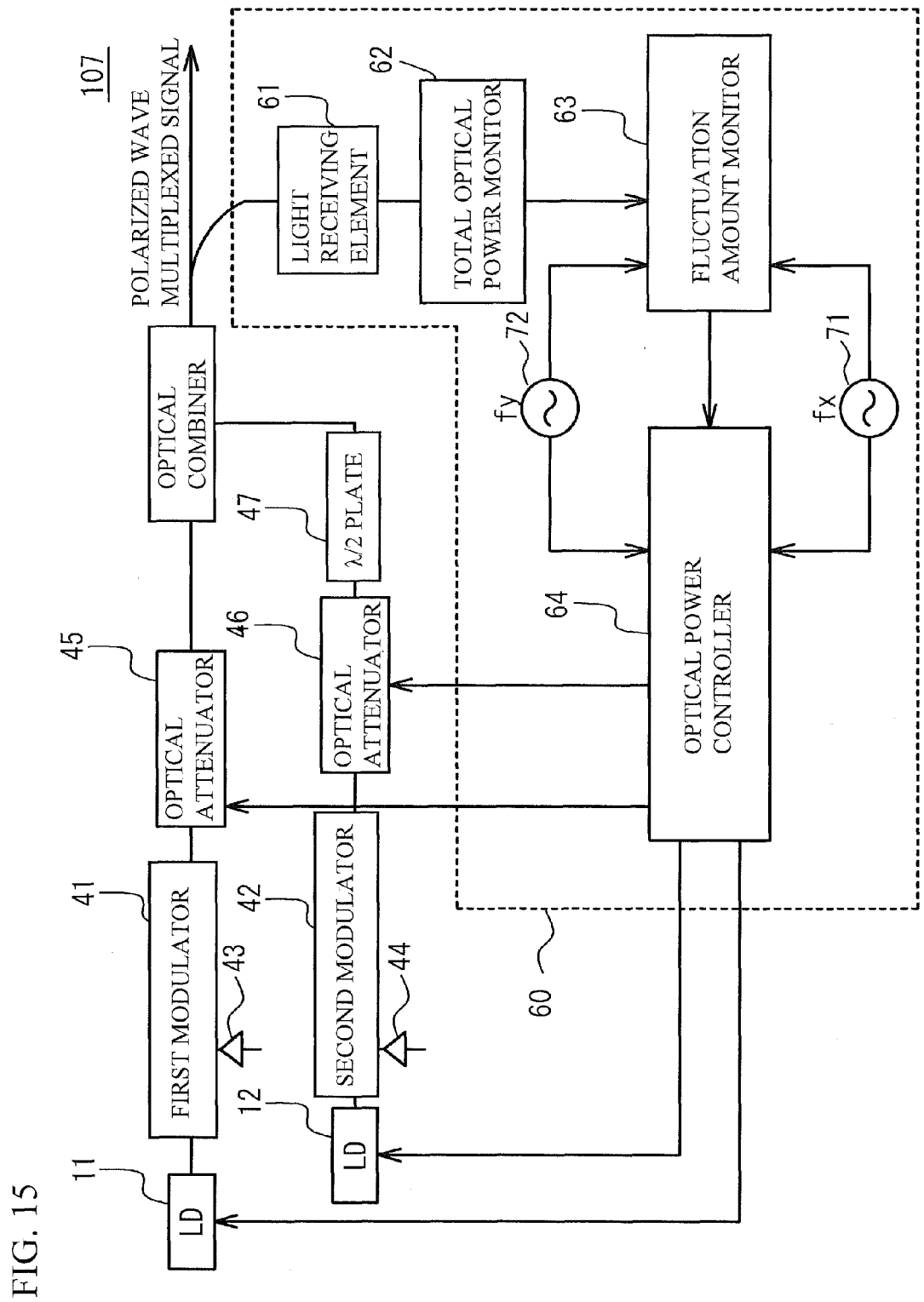
FIG. 15 illustrates a block diagram of an optical transmitter in accordance with a modified embodiment of the fourth embodiment.

FIG. 15 illustrates a block diagram of an optical transmitter 107 in accordance with a modified embodiment of the fourth embodiment. As illustrated in FIG. 15, the optical transmitter 107 is different from the optical transmitter 106 of FIG. 14 in a point that the first optical attenuator 45 and the second optical attenuator 46 are further provided. The first optical attenuator 45 is provided between the first modulator 41 and the optical combiner 50. The second optical attenuator 46 is provided between the second modulator 42 and the optical combiner 50.

In the modified embodiment, the optical power controller 64 controls the first optical attenuator 45 and the second optical attenuator 46 based on the detection result of the total-optical-power monitor 62 and the fluctuation amount monitor 63 so that the optical power difference between the X polarized-wave and the Y polarized-wave is reduced. In concrete, the optical power controller 64 controls the first optical attenuator 45 and the second optical attenuator 46 so that the variation of the fluctuation amount of the total optical power during the dithering by the first dither generation portion 71 and the second dither generation portion 72 is a predetermined value or lower. For example, the variation of "fluctuation amount of total optical power"/"average of total optical power" may be used as the fluctuation amount of the total optical power.

In the fourth embodiment, the first dither generation portion 71 and the second dither generation portion 72 act as an optical power fluctuation portion for periodically fluctuating the optical power of the first modulation signal and the second modulation signal.

[e] Fifth Embodiment

Figure 16:
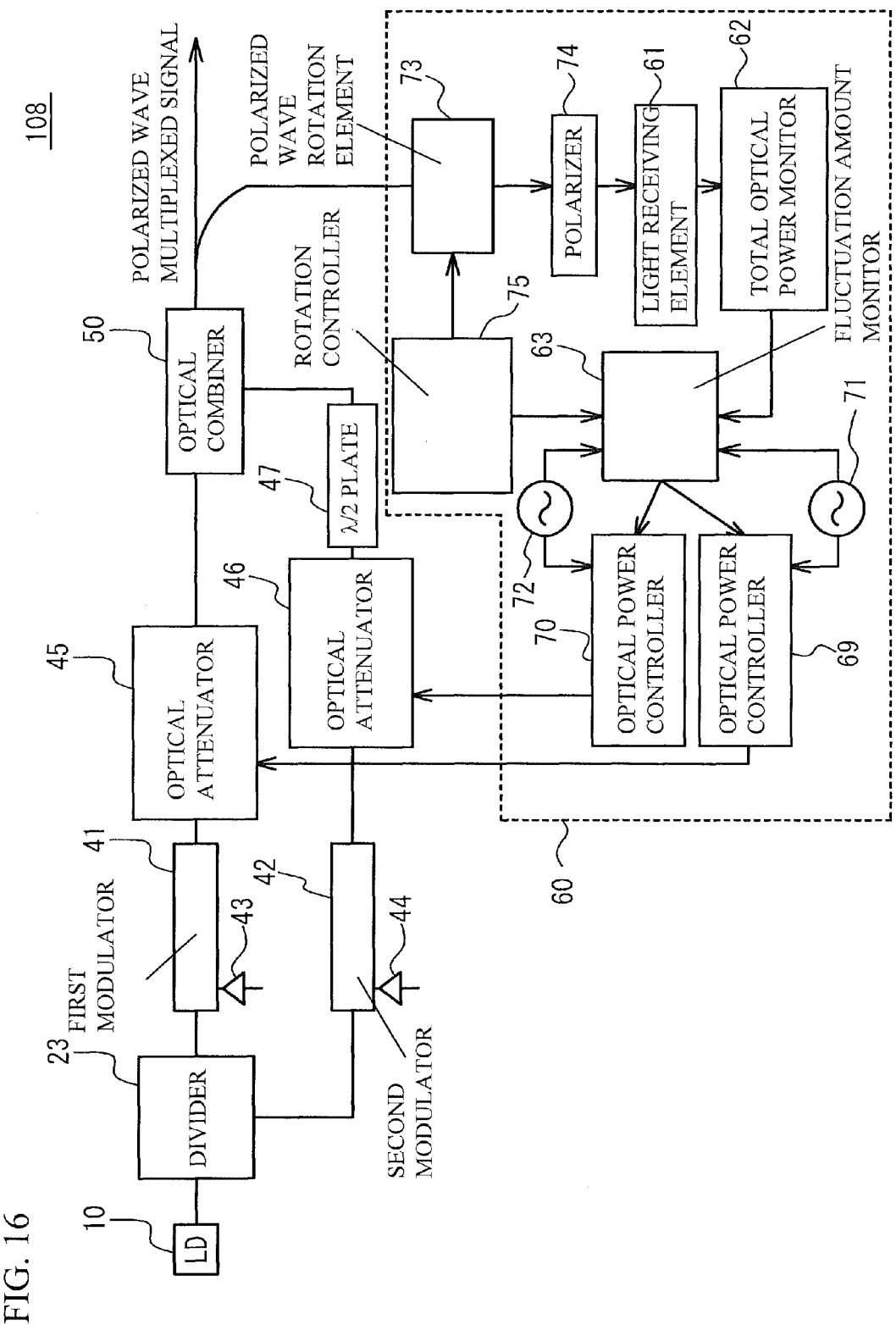
FIG. 16 illustrates a block diagram of an optical transmitter in accordance with a fifth embodiment.

FIG. 16 illustrates a block diagram of an optical transmitter 108 in accordance with a fifth embodiment. As illustrated in FIG. 16, the optical transmitter 108 is different from the optical transmitter 105 of FIG. 10 in a point that a polarized-wave rotation element 73, a polarizer 74 and a rotation controller 75 are further provided. The polarized-wave rotation element 73 receives the polarized-wave-multiplexed optical signal that is multiplexed at the optical combiner 50. The polarized-wave rotation element 73 polarization-rotates the polarized-wave-multiplexed optical signal in accordance with an instruction of the rotation controller 75, and inputs the polarization-rotated polarized-wave-multiplexed optical signal into the polarizer 74. The polarizer 74 extracts light component in a predetermined polarization direction and inputs the extracted light component into the light-receiving element 61.

The first dither generation portion 71 inputs a dither signal X of frequency a into the first optical power controller 69 and the fluctuation amount monitor 63. The first optical power controller 69 fluctuates the optical attenuation amount of the first optical attenuator 45 at the frequency fx. The second dither generation portion 72 inputs a dither signal Y of frequency fy into the second optical power controller 70 and the fluctuation amount monitor 63. The second optical power controller 70 fluctuates the optical attenuation amount of the second optical attenuator 46 at the frequency fy.

The fluctuation amount monitor 63 may extract the optical power fluctuation amount of a frequency component of the polarized-wave rotation element 73. The first optical power controller 69 and the second optical power controller 70 control the first optical attenuator 45 and the second optical attenuator 46 so that the frequency component of the polarized-wave rotation element 73 is zero or near zero. Thus, the optical power difference between the X polarized-wave and the Y polarized-wave may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A polarized-wave-multiplexing optical transmitter comprising:
    an optical combiner generating a polarized-wave-multiplexed optical signal by polarized-wave-multiplexing a first optical modulation signal and a second optical modulation signal;
    an optical power fluctuation portion fluctuating optical power of the first optical modulation signal and the second optical modulation signal periodically so that a sign of each fluctuation is opposite to each other;
    a total-optical-power detection portion detecting fluctuation amount of total optical power of the polarized-wave-multiplexed optical signal; and
    an optical power controller reducing an optical power difference between the first optical modulation signal and the second optical modulation signal based on detection result of the total-optical-power detection portion.

2. The polarized-wave-multiplexing optical transmitter as claimed in claim 1, wherein the optical power controller controls the optical power of the first optical modulation signal and the second optical modulation signal so that variation of the fluctuation amount of the total optical power with respect to an average of the total-optical-power is a predetermined value or lower.

3. The polarized-wave-multiplexing optical transmitter as claimed in claim 1, wherein the fluctuation amount of the total optical power is a fluctuation amount of a single cycle of fluctuation of the optical power of the first optical modulation signal and the second optical modulation signal with use of the optical power fluctuation portion.

4. The polarized-wave-multiplexing optical transmitter as claimed in claim 1 further comprising:
    a divider dividing an optical signal incoming from a light source into two polarized-waves crossing at right angle;
    an incoming angle setting portion setting incoming angle of the two polarized-waves of an optical signal input into the divider from the light source; and
    an optical modulator obtaining the first optical modulation signal and the second optical modulation signal by modulating the two polarized-waves,
    wherein the optical power fluctuation portion and/or the optical power controller control the optical power of the first optical modulation signal and the second optical modulation signal by changing the incoming angle of the polarized-waves with use of the incoming angle setting portion.

5. The polarized-wave-multiplexing optical transmitter as claimed in claim 1 further comprising:
    a first optical attenuator of which optical attenuation amount is changeable; and
    a second optical attenuator of which optical attenuation amount is changeable, wherein the optical power fluctuation portion and/or the optical power controller controls the optical power of the first optical modulation signal and the second optical modulation signal by fluctuating optical attenuation amount of the first optical attenuator and the second optical attenuator.

6. The polarized-wave-multiplexing optical transmitter as claimed in claim 1, wherein:
    the first optical modulation signal and the second optical modulation signal are generated from two optical signals output from different two light sources; and the optical power fluctuation portion and/or the optical power controller controls the optical power of the first optical modulation signal and the second optical modulation signal by fluctuating driving electrical signal of the two light sources.

7. The polarized-wave-multiplexing optical transmitter as claimed in claim 6, wherein:
    the first optical modulation signal and the second optical modulation signal are optical modulation signals obtained from a normal phase signal and a reversed phase signal of a RZ modulation signal of which polarized-wave condition is rotated by 90 degrees from each other; and
    the optical power fluctuation portion and/or the optical power controller controls the optical power of the first optical modulation signal and the second optical modulation signal by fluctuating a bias voltage applied to the RZ modulator.

8. A control method of a polarized-wave-multiplexed optical signal comprising:
    generating a polarized-wave-multiplexed optical signal by polarized-wave-multiplexing a first optical modulation signal and a second optical modulation signal;
    periodically fluctuating optical power of the first optical modulation signal and the second optical modulation signal so that a sign of each fluctuation is opposite to each other;
    detecting fluctuation amount of total optical power of the polarized-wave-multiplexed optical signal; and
    reducing optical power difference between the first optical modulation signal and the second optical modulation signal based on detection result of the detecting of the fluctuation amount.

* * * * *